(12) United States Patent
Keller

(10) Patent No.: US 12,063,198 B2
(45) Date of Patent: *Aug. 13, 2024

(54) MULTI-CHANNEL COMMUNICATION PLATFORM WITH DYNAMIC RESPONSE GOALS

(71) Applicant: NIKE, Inc., Beaverton, OR (US)

(72) Inventor: Dan Keller, Banks, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,038

(22) Filed: Jul. 18, 2023

(65) Prior Publication Data

US 2023/0362126 A1 Nov. 9, 2023

Related U.S. Application Data

(63) Continuation of application No. 17/503,637, filed on Oct. 18, 2021, now Pat. No. 11,743,228, which is a continuation of application No. 16/888,616, filed on May 29, 2020, now Pat. No. 11,153,260.

(60) Provisional application No. 62/855,917, filed on May 31, 2019.

(51) Int. Cl.
| | |
|---|---|
| *G06F 15/16* | (2006.01) |
| *H04L 51/04* | (2022.01) |
| *H04L 51/214* | (2022.01) |
| *H04L 51/216* | (2022.01) |
| *H04L 51/58* | (2022.01) |
| *H04W 4/12* | (2009.01) |

(52) U.S. Cl.
CPC .............. *H04L 51/58* (2022.05); *H04L 51/04* (2013.01); *H04L 51/214* (2022.05); *H04L 51/216* (2022.05); *H04W 4/12* (2013.01)

(58) Field of Classification Search
CPC ..... H04L 51/58; H04L 51/216; H04L 51/214; H04L 51/04; H04W 4/12
USPC ........................................................ 709/206
See application file for complete search history.

(56) References Cited

U.S. PATENT DOCUMENTS

| | | | |
|---|---|---|---|
| 10,761,897 B2 * | 9/2020 | LaBute | ................... G06N 3/045 |
| 11,153,260 B2 * | 10/2021 | Keller | ..................... H04L 51/02 |

(Continued)

FOREIGN PATENT DOCUMENTS

| | | |
|---|---|---|
| JP | 2003058464 A | 2/2003 |
| JP | 2003122890 A | 4/2003 |
| JP | 2006202173 A | 8/2006 |

(Continued)

*Primary Examiner* — Alicia Baturay
(74) *Attorney, Agent, or Firm* — Quinn IP Law

(57) ABSTRACT

A multi-channel communication platform includes a messaging engine a routing engine and a queue manager. The messaging engine is operative to receive a plurality of textual messages from a user, the plurality of textual messages forming a message thread and including at least one query requesting a reply. The routing engine is operative to transmit the message thread to a message queue associated with a live agent and to receive a reply from the live agent and transmit the reply to the user. The queue manager is operative to provide the live agent with an adjustable reward following a response to the query, with the amount of the award being based on one or more of: the perceived complexity of the query; a number of outstanding or unassigned queries; or the perceived urgency of the query.

11 Claims, 10 Drawing Sheets

(56) References Cited

U.S. PATENT DOCUMENTS

| | | | |
|---|---|---|---|
| 11,743,228 B2 * | 8/2023 | Keller | H04L 51/56 709/206 |
| 2005/0026250 A1 | 2/2005 | Zhao et al. | |

FOREIGN PATENT DOCUMENTS

| | | |
|---|---|---|
| JP | 2017072976 A | 4/2017 |
| KR | 20030021340 A | 3/2003 |
| KR | 20100048733 A | 5/2010 |
| KR | 20120095172 A | 8/2012 |
| KR | 20180003235 A | 1/2018 |

* cited by examiner

MULTI-CHANNEL COMMUNICATION PLATFORM WITH DYNAMIC RESPONSE GOALS

CROSS REFERENCE TO RELATED APPLICATIONS

The present application is a continuation of U.S. patent application Ser. No. 17/503,637, filed on 18 Oct. 2021 and published as US 2022/0038418, and which is a continuation of U.S. patent application Ser. No. 16/888,616, filed on 29 May 2020 and issued as U.S. Pat. No. 11,153,260, which claims the benefit of priority from U.S. Provisional Patent Application No. 62/855,917, filed on 31 May 2019. Each application is hereby incorporated by reference in its entirety.

TECHNICAL FIELD

The present disclosure relates to a multi-channel communication platform for managing communication and workflow.

BACKGROUND

Given the rise of mobile internet technology, the manner in which individuals and businesses communicate is rapidly changing. Unlike voice communication, where an individual is generally capable of maintaining only one conversation at any given time, new forms of communication (e.g., SMS, MMS, IP based client messaging) enable users to simultaneously converse with multiple different parties concurrently. In addition to being able to handle more concurrent conversations, these new means of communication each may have acceptable response times that can vary based on the urgency of the user. For example, an active user with an urgent query may demand a prompt, near-real-time response. Conversely, a user with a casual question, sent via SMS, may set their device down following the question and not check it again for a few hours. In one study, where a standard web chat involved an average of 8 minutes of handle time over an 8 minute contiguous block of time, an SMS chat involved a similar average of 8 minutes of handle time, though spread over 1.5 hours of sporadic contact.

The challenge of managing acceptable response time goals becomes particularly problematic if an agent were asked to converse across multiple messaging platforms, each with different customer expectations of what constitutes an acceptable delay in receiving a response. If longer response times are permissible, staffing requirements may be reduced, which presents a cost savings to the company. As such, the shift to new forms of communication presents an opportunity to balance customer service response workloads that is not available with a live telephone conversation.

SUMMARY

The present disclosure provides, among other things, a Robotic, Optimized Clienteling Communications platform (ROCCo) that can provide a dynamic customer service experience between a consumer and an enterprise. The robotic nature can utilize machine learning and natural language understanding to augment live agent abilities/responsiveness while also delivering a superior level of service to the consumer. The system may permit clienteling at scale to produce unbreakable, long term relationships while also enabling cross-platform communications that can pivot with real-time consumer demand. In a broad sense, the goal of the present system is to make conversation easy while providing relationship-rich omnichannel communication and support at scale.

In some embodiments of the present disclosure, a multi-channel communication platform may include a messaging engine, a routing engine, and a queue manager. The messaging engine may be operative to receive a plurality of textual messages from a user through any of a plurality of different messaging services in communication with the messaging engine. The plurality of textual messages form a message thread and include at least one query requesting a reply. The routing engine may then be operative to determine a momentum of the plurality of textual messages. Finally, the queue manager may assign the message thread to a message queue associated with an agent. The message queue specifies a response time goal for providing the reply to the at least one query, where the response time goal is inversely proportional to the determined momentum.

Further extensions of the present disclosure provide systems that assist a live agent in providing customer service to a user and/or in answering a user's query. Such systems may include an automated agent with natural language processing capabilities that provide the live agent with proposed response language for addressing the user's query. In some embodiments, the automated agent may populate a support window on a user interface of the live agent with information about the user. Such information may include, and without limitation, a product preference of the user, a size of the user, an indication of the user's recent browsing history, a summary of the user's product interests, a summary of the user's spending patterns, a summary of prior message threads with the user, a summary of user tagged products, or a summary of the user's purchasing history.

Further, the automated agent may generate and display on the support window, one or more hyperlinks to an internet webpage where a product is offered for sale. Such links may be derived from the context of the message thread between the user and the live agent. In one embodiment, the internet webpage may belong to a retailer, though may enable inventory from a third party to be purchased through the retailer's webpage.

DETAILED DESCRIPTION

The following discussion and accompanying figures disclose a multi-channel communication system (e.g., system 10 of FIG. 1) that may be used to provide customer service and/or support to a user. In many embodiments, the user may be an end user and/or an existing or prospective customer. In other embodiments, however, the user may be a retail sales associate, where the system may respond to questions regarding specific product information, style advice, and/or custom product ordering.

As a general matter of terminology, when the present disclosure references a "user," this is meant to refer to person who is seeking support. In a retail context, the user is generally an existing or prospective customer. Furthermore, the provider of information and/or the person responding to the inquiry is referred to as the "agent" or "specialist."

In some embodiments, this system may be configured to determine an appropriate response-time goal for an agent based upon the conversational speed of the user and/or the perceived urgency of the user's message. In doing so, the present system differs from conventional systems where response-time goals are based solely upon the messaging modality (e.g., an agent is capable of maintaining five concurrent SMS threads).

The system may further operate to improve the quality and/or speed of a service agent's response by analyzing the user's query and by routing the thread or query to an agent or specialist that is most knowledgeable about that particular subject. In instances where multiple queries of differing subject matter are made in close proximity of each other, each may be separately routed to a different agent. To provide a better flow for the conversation with the user, one agent may be deemed the primary response agent, and all other secondary agents may feed their responses to that primary agent for synthesis into the conversation.

The system may also support the agent's ability to provide relevant product or support information by coordinating the messaging client with the user's account information. In this manner, the agent's display may populate with specific sales information (e.g., to provide shipment or return support), customer-specific preferences/sizes, purchase tendencies, or other such relevant information. In some embodiments, this ancillary information may be based on user account data, and in some embodiments it may be further refined by the context of the received message.

Figure 1:
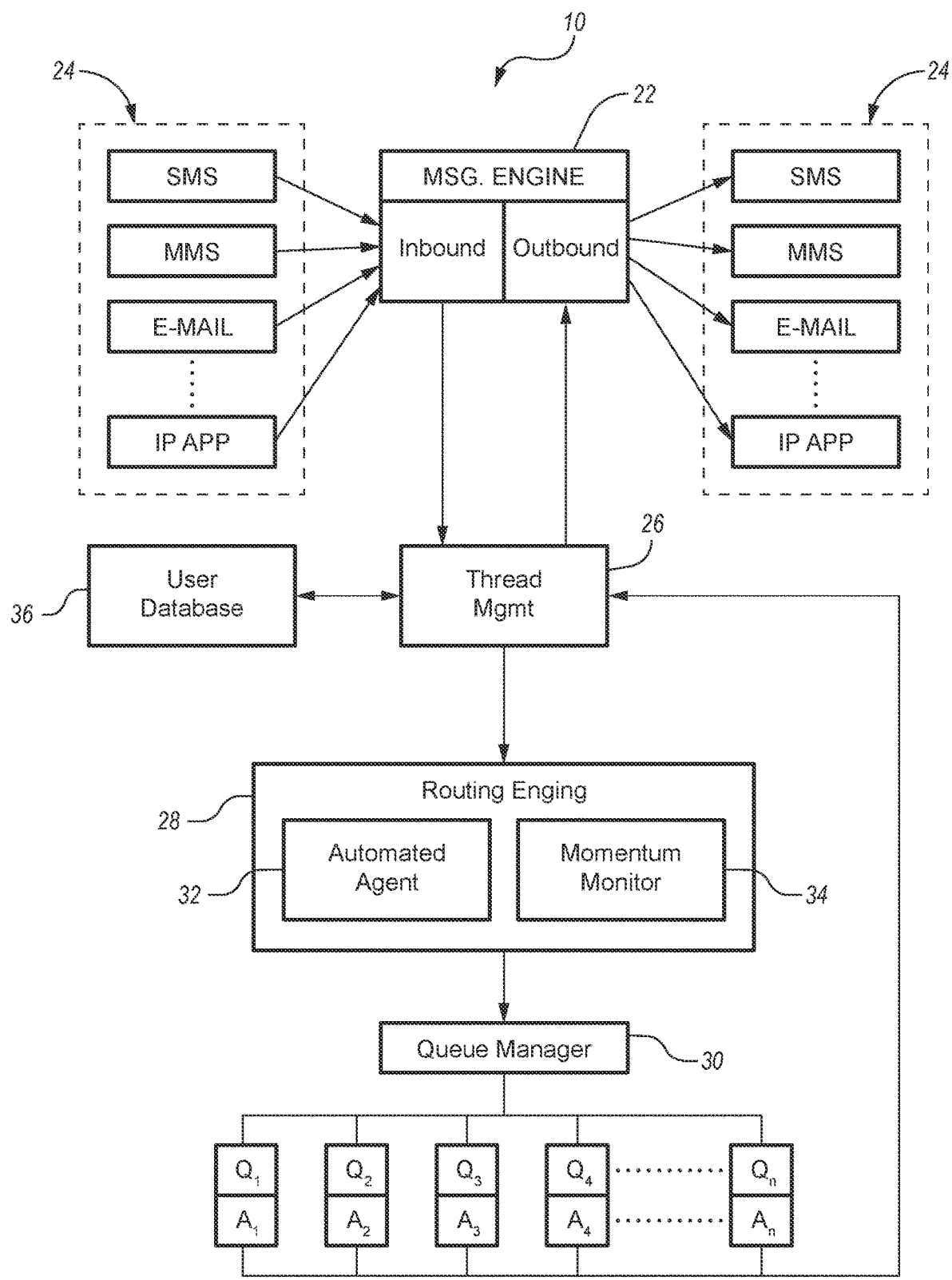
FIG. 1 is a schematic diagram of a multi-channel communication system that may be used to provide customer service and/or support to a user.

As shown in FIG. 1, a multi-channel communication system 10 may include a messaging engine 22 in communication with one or more messaging services 24, a thread management system 26, a routing engine 28, and a queue manager 30. In some embodiments, the routing engine 28 may include an automated agent 32, and a momentum monitor 34.

The various messaging services 24 may typically be managed by external providers and may each operate on a different communication networks, utilize one or more different transport protocols, and/or communicate with different endpoint devices. Examples of different messaging services 24 may include a short message service (SMS), a multimedia messaging service (MMS), a push notification service, an internet protocol (IP) messaging service, proprietary third party messaging service, email service, and/or any suitable communication service. Each of the messaging services 24 can include dedicated communication service instances, channels, and different routing options.

The messaging engine 22 may include or may be operably connected with a messaging client that is configured to communicate over each or any of the connected messaging services 24. The messaging client may serve as a front end for communication via the messaging engine 22, and may include, for example, a voice and/or text-based interface through which a user may communicate. The messaging engine 22 may be used in transmitting messages, receiving messages, and managing synchronous/asynchronous communication sessions via the messaging client. In one configuration, the messaging engine 22 may be configured to communicate using a plurality of different communication protocols that may be specific and/or utilized by the different messaging services 24. For example, with an SMS message, the communication may rely on SMPP connections to various service provider destinations; with an MMS message, the communication may rely on SMTP connections to various service provider destinations (for MM4) or alternatively they can rely on service resources accessed over HTTP/SOAP (for MM7). In many cases, the service provider responsible for a particular messaging service 24 may provide an API that enables bidirectional communication with other clients/users on that service.

Figure 2:
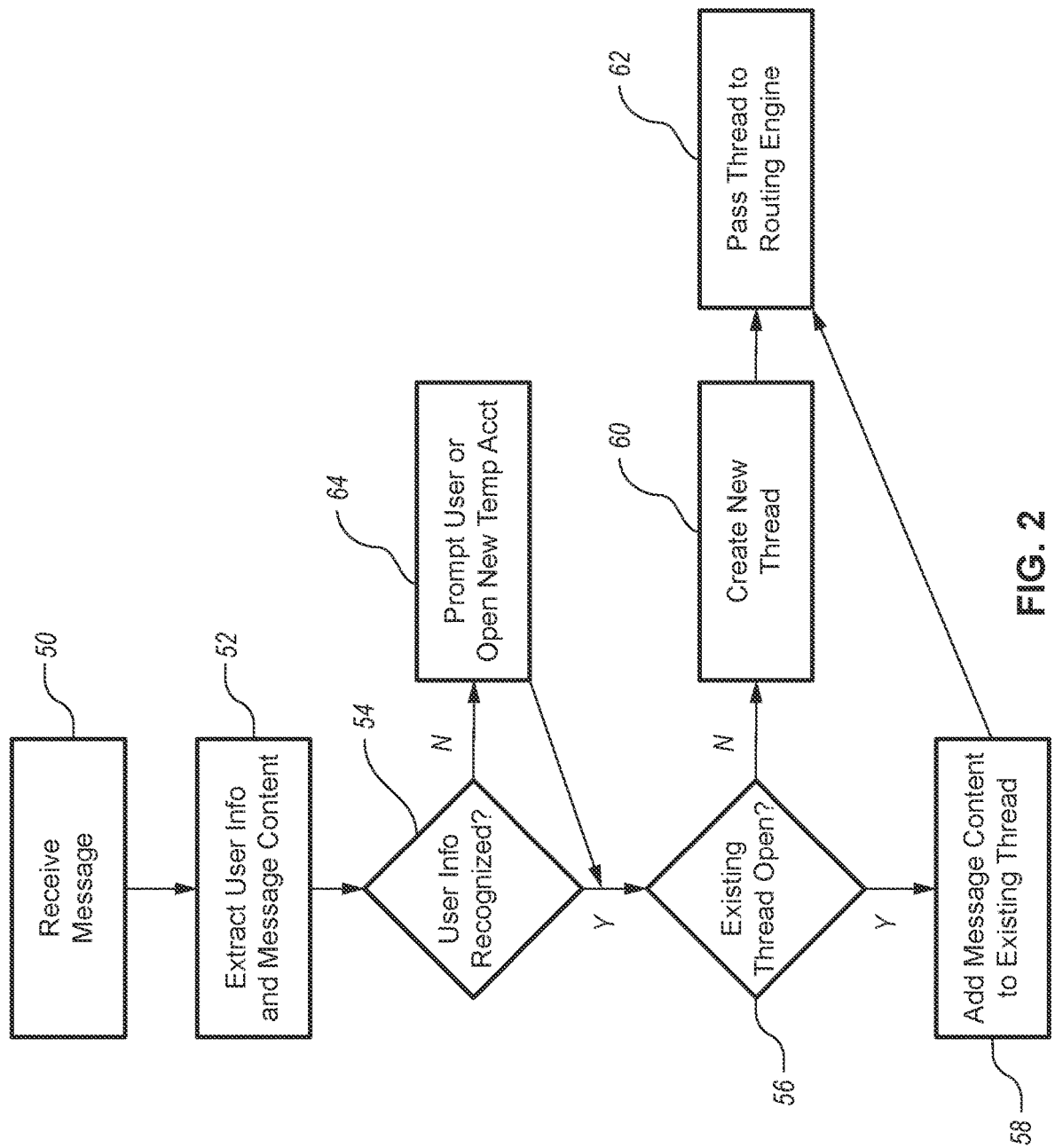
FIG. 2 is a schematic flow diagram for managing one or more conversation threads in a multi-channel communication system, such as shown in FIG. 1.

FIG. 2 schematically illustrates a method of taking received message from the messaging service 24 and building it into a message thread to be passed to the message routing engine 28 as shown in FIG. 1. As generally illustrated, following the receipt of a message from a messaging service 24 (at 50), the messaging engine 22 may be configured to extract both user identifying information and message content from that message (at 52). The user identifying information may be, for example, a telephone number, a username, a user number, a device id number, or the like. In many cases, the user identifying information may be encoded as part of the message and/or may precede the message in a header block. Once extracted, this information may be passed to the thread management system 26 where the message content may be associated to a user account maintained in a user database 36.

The thread management system 26 may generally be responsible for maintaining one or more ongoing message threads for each user, regardless of when the message is received. With continued reference to FIG. 2, if the user identifying information from the message is recognized from the user database (at 54), the thread management system 26 may then check that user's account to determine whether an existing communication thread is open (at 56). If there is an existing open thread, the message content may be appended to that open thread (at 58). If no open thread exists, then the thread management system 26 may create a new thread (at 60) and pass that thread to the routing engine 28 (at 62).

If the user identifying information is not recognized (at 54), either a new temporary account may be created, or the user may be prompted by a return message (via the same messaging service 24) to provide identifying information that may enable a user account to be accessed (at 64). In some instances, an orphan thread or created temporary account may be migrated to a user's account later in the conversation, for example, once order specific details are provided to an agent. As one example, if a user's message indicates that they wish to return an item, the user identifying information may ultimately flow from the message content, such as an order number that may be linked to a user account.

Referring again to FIG. 1, the routing engine 28 may generally be responsible for routing new message threads and new messages (including any secondary information related to the message threads) to the appropriate live agent who may best support the user's query. As noted above, in some embodiments, the routing engine 28 may include an automated agent 32 or artificial intelligence that is capable of understanding the nature and context of the message, and a momentum monitor 34 that is operative to determine the momentum of the message thread. Knowing the nature and context of the message may enable the routing engine 28 to identify the appropriate agent (or pool of qualified agents) to handle the query based on subject matter, technical expertise, or sensitivity of the request. Further, by knowing the momentum of the message thread, the system may be more adept at balancing message loads between individual agents according to the sensitivity and/or message frequency of a particular thread.

The automated agent 32 may include a natural language response engine that is capable of understanding the nature and content of the request. In some embodiments, the automated agent 32 may further include an artificial intelligence component that is operative to engage in a preliminary discussion with the user upon receipt of an initial message. For example, the automated agent 32 may address simple requests such as obtaining specific contact information, obtaining retail addresses, determining order status, and the like. Further, the automated agent 32 may also serve the function of obtaining essential information that may be required by a live agent. For example, if a return is requested, the automated agent 32 may inquire about the specific product, the order number, and/or the underlying reasons for the return.

In general, including an automated agent 32 in the initial message receipt may provide several benefits. First, it may dispose of simple requests at a lower cost than if a live agent were required. Second, it may gather information that may be required by the agent to answer a particular query. In this manner, the live agent is not required to expend response time/effort performing preliminary fact finding. Third, the automated agent 32 may engage with the user in a prompt manner to provide the user with a sense of initial responsiveness even if a live agent is not presently available or has a large queue of queries to answer. This responsiveness may help prevent the creation or escalation of any user frustration. Finally, the back and forth with the automated agent 32 may create a base message thread from which the momentum monitor 34 may determine the momentum of the conversation and set appropriate response time goals for the live agent.

The notion of conversation momentum recognizes that when conversing over text-based messaging platforms, different users may message at different rates and with different levels of urgency. A user who is engaged in a synchronous conversation (i.e., real time back and forth) may have a high velocity that may demand greater agent capacity (i.e., if the agent is engaged in real-time back and forth, then there is less capacity to handle additional message threads with other users). Conversely, a user who messages in an asynchronous manner may have a slow velocity (i.e., the user may set their phone down for hours between text message responses, or only check email periodically throughout the day). This slower velocity may not require the same prompt response that would be demanded in a synchronous conversation. As such, the slow velocity may enable the agent to handle comparatively more message threads at any given period of time.

Similar to velocity, the urgency or mass of the query should also be accounted for in determining the response goal. Extremely urgent requests, or requests with a greater sense of user frustration or anger may require a more prompt agent response to avoid unnecessarily escalating the concern. Conversely, a casual request (e.g., is there anything new coming out this weekend) may have a comparatively lower mass that does not require the same level of prompt attention. In one embodiment, a conversational mass may be determined by a natural language processing algorithm that may aim to understand the nature of the request together with the level of emotion conveyed by the thread.

In some embodiments, a conversation's mass may further be influenced by one or more attributes of the user's account. For example, a message from a retail store employee may be assigned a higher mass than a user with no prior experience with the company. Similarly, other factors such as sales history, social media exposure, public influence, company engagement, and/or customer demographics may influence mass. For example, a celebrity with high social media exposure, high public influence, and a corporate sponsorship from the company may have a greater mass than a customer who has a minimal sales history and no social media exposure. While the mass should not affect the care with which the user is handled, it can be used to adjust an agent's queue size or the number of other message threads the agent may handle concurrently with that request. In this example, the celebrity may consume an agent's entire queue such that that agent may handle no other message threads. Likewise, the sporadic consumer may be assigned to an agent who is managing multiple message threads concurrently.

In one embodiment, a conversation's mass may be scored on a 0-100 scale by the automated agent 32. This scoring may a percentile-like scoring, where a 0 has absolutely no urgency or emotion and a 100 is pure urgency and pure emotion (i.e., both numbers being theoretically unobtainable). Each message or collection of messages may then be scored according to their use of expressive or inflammatory words, phrases or context that connotes a time-sensitive inquiry, or the like. Message velocity may be scored, for example, as the frequency of the received message (i.e., the inverse of the instantaneous or average period between messages). Conversation momentum may therefore equal the relative, scored mass, multiplied by the average frequency.

Figure 3:
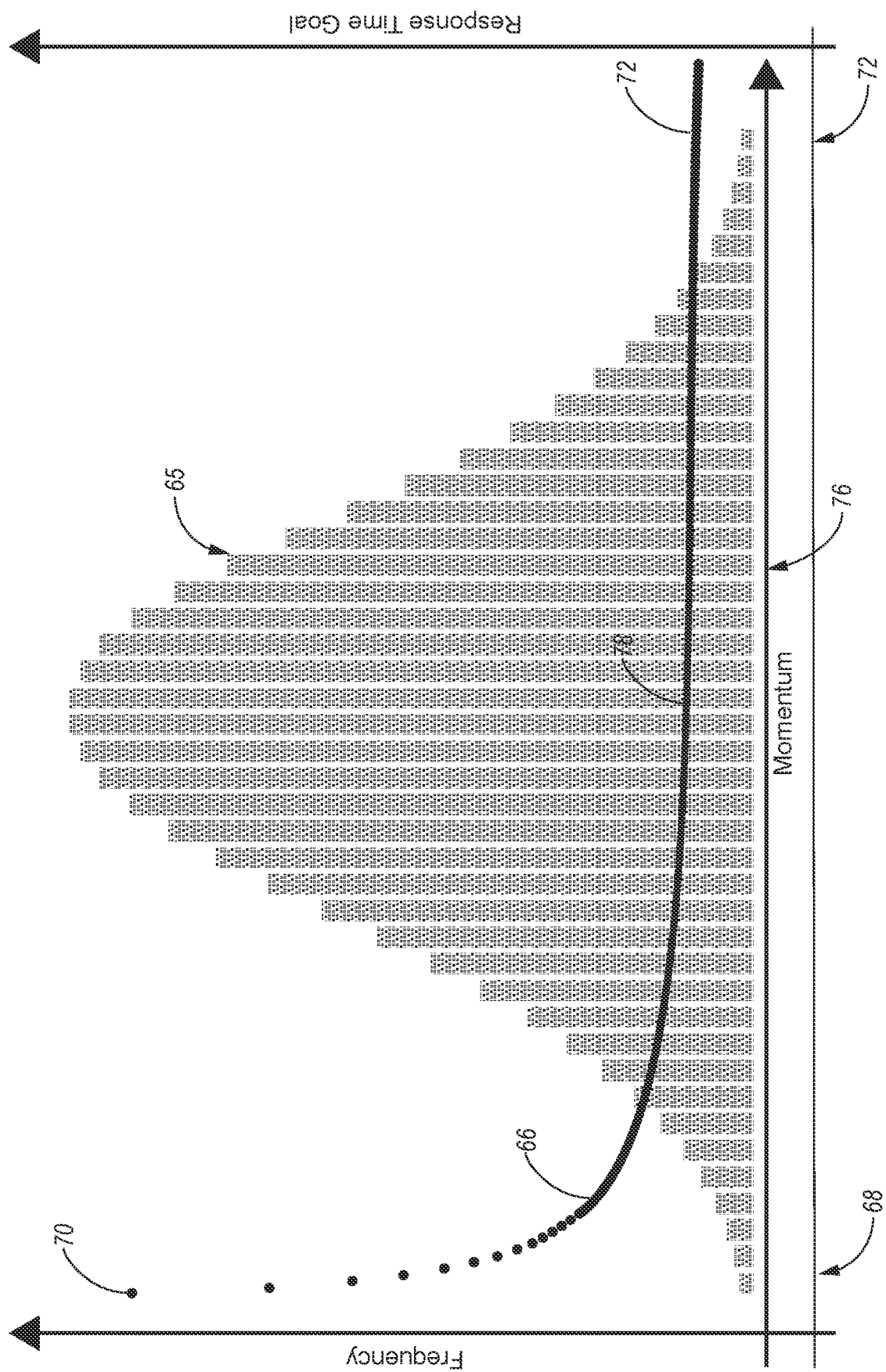
FIG. 3 is a schematic graph of response time goals set as a function of a conversation momentum distribution.

It has been found that a histogram of conversation momentum 65 generally takes the form of a normal distribution/bell curve, such as shown in FIG. 3 (i.e., with conversation momentum being represented on the horizontal x-axis, and frequency on the y-axis). In some embodiments, the momentum distribution 65 may be used to set response time goals 66 (represented on the secondary y-axis). For example, a conversation with momentum in the lowest decile 68 (i.e., lowest momentum constituting comparatively slower messaging velocity and comparatively lower urgency) may have a response time goal set at a first value 70, such as 15 minutes. Conversely, a conversation with a momentum in the highest decile 72, (i.e., greatest momentum constituting comparatively greater messaging velocity and comparatively greater urgency) may have a response time goal set at a second value 74, such as 15 seconds. Finally, a conversation with a momentum at the median 76 on the momentum distribution may have a response time goal set at a third value 78, such as 30 seconds. In one configuration, such as illustrated via the example goals, the response time goal function across the distribution may by non-linear. This is because differences in user expectations on the upper end of the distribution have been found to only marginally vary, whereas acceptable response times on the lower end of the distribution are more heavily influenced by a user's sporadic conversation pattern, which affords a significantly greater response time. As such, the applicable response time goal may vary inversely, though non-linearly with the determined momentum. In another embodiment, not shown, the applicable response time goal may vary inversely and linearly with the determined momentum.

Referring again to FIG. 1, in one configuration, the momentum monitor 34 may analyze the preliminary conversation between the user and the automated agent 32 to assess the mass of the query along with the velocity at which the user converses. Quantitative measures of these two factors may then be combined to form a measure of momentum which will be used to dynamically set agent response-time goals, adjust the size of the agent's queue, and allow the agent to prioritize which pending queries should be responded to first.

Figure 4:
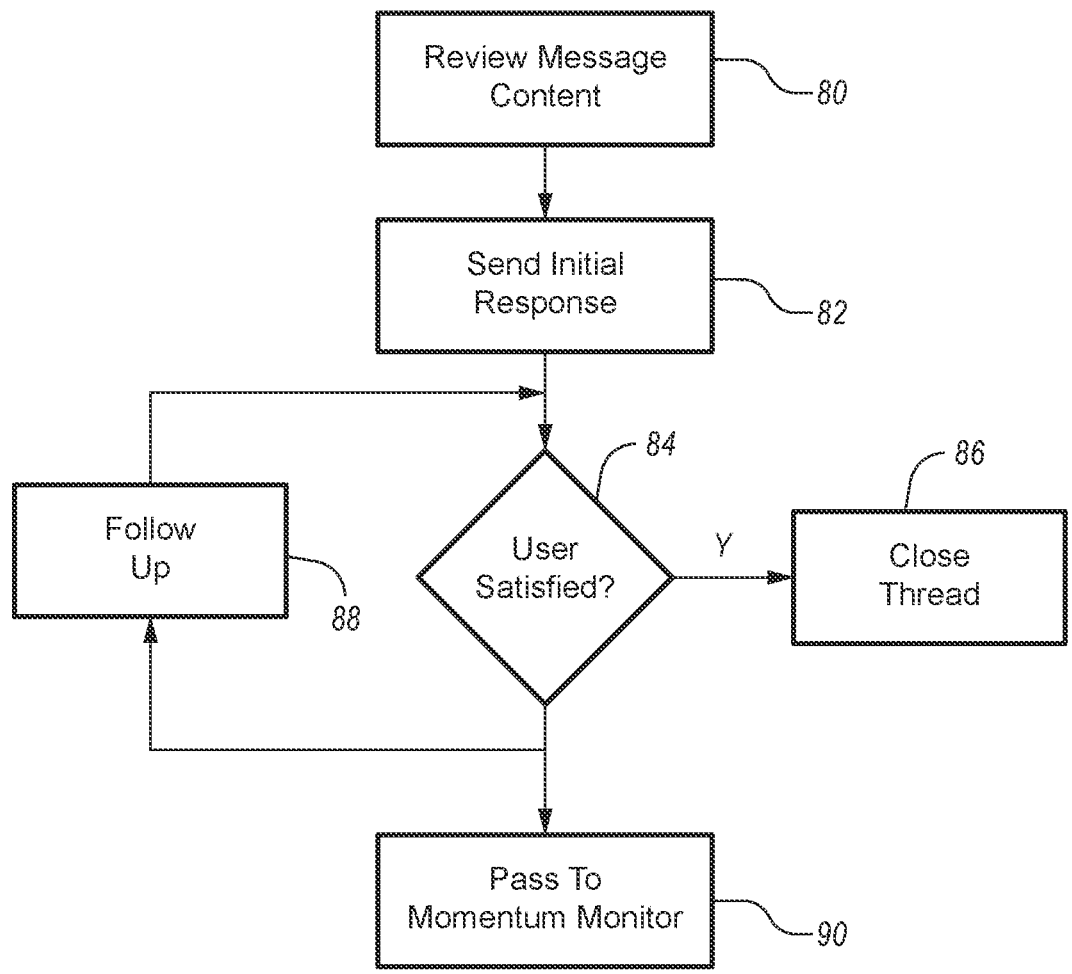
FIG. 4 is a schematic flow diagram for initially responding to a user via an automated agent.

FIG. 4 schematically illustrates a method of initially responding to a user query, such as may be performed by the automated agent 32. As shown, once the message thread (or some indication that a new thread has been opened) has been passed to the routing engine 28, the automated agent 32 may review the initial message (at 80) using one or more natural language algorithms to determine the nature and urgency of the request. The automated agent 32 may then respond to the user (at 82) with a greeting, a recognition of the user's request, and either an answer to the user's request or a follow up question. Upon receipt of a subsequent message from the user, the automated agent 32 may determine (at 84) whether the prior response satisfied the user's query. If so, then the automated agent 32 may close the thread (at 86). If not, the agent 32 may either follow up with the user (at 88) or pass the thread to the momentum monitor 34 (at 90).

Figure 5:
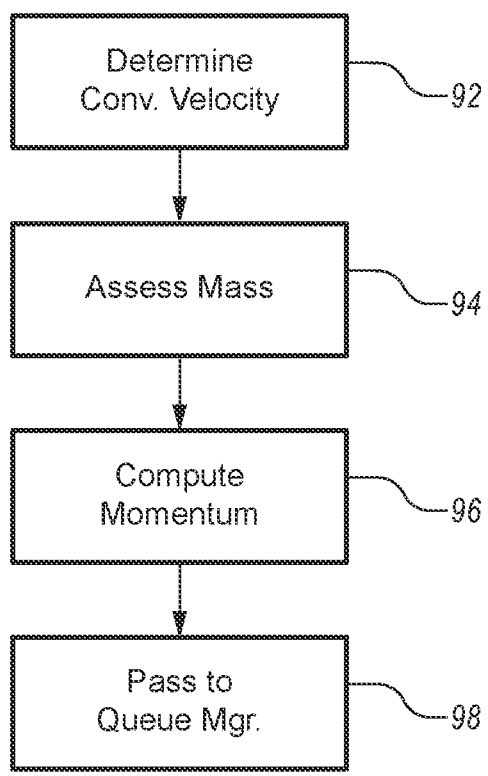
FIG. 5 is a schematic flow diagram for determining a momentum of a conversation.

FIG. 5 schematically illustrates one manner of operation for the momentum monitor 34. As shown, the momentum monitor 34 may review the thread to determine a conversation velocity (at 92) based on the average time for the user to respond (i.e., to either begin or send the response). In one embodiment, the velocity may reflect a total average of all response times. In another embodiment, the velocity may reflect a simple or exponential moving average (which may weight more recent user response times greater than initial user response times. The momentum monitor 34 may then make an assessment of the mass of the conversation (at 94) based upon at least one of: a natural language assessment of the emotion of the messages (e.g., strong positive to strong negative) and/or the nature of the request (e.g., casual to urgent); or a user characteristic, attribute, relationship or engagement with the company, sales history, public influence, social media presence, and/or the like.

From the calculated velocity and determined mass, the momentum monitor 34 may then compute a momentum score (at 96) that reflects the combination of the two parameters. This momentum score, together with any available conversation context from the automated agent, may then be used by the routing engine 28 to dynamically assign the message thread to an available live agent. Once assigned, the thread may be passed to the queue manager 30 (at 98) to supervise timeliness of responses within each user's respective queue.

Figure 6:
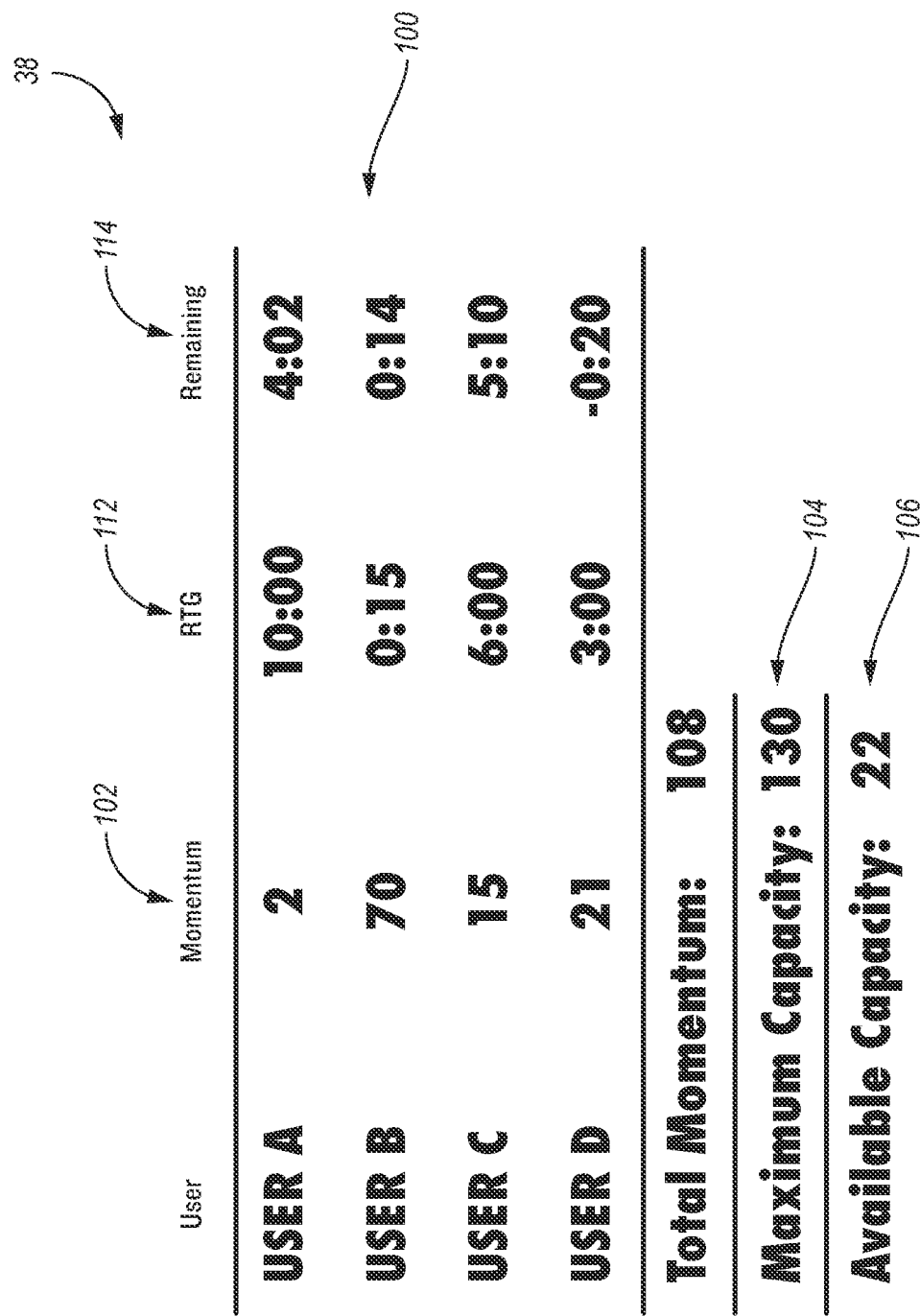
FIG. 6 is a schematic table illustrating a queue of message threads that may be managed by a customer service agent.

Referring again to FIG. 1, the present system may generally include a plurality of live agents ($A_1$ through $A_n$), each having their own respective message queue ($Q_1$ through $Q_n$) that they are responsible for answering/managing. In general, the message queue may comprise a one or more conversation threads that a live agent is responding to at any given time. FIG. 6 schematically illustrates an example of a message queue 38 that comprises a plurality of open message threads 100, each having a determined thread momentum 102. Each live agent may have a predefined maximum response capacity 104 that is representative of their skill and throughput as an agent. The routing engine 28, in combination with the queue manager 30 should operate such that the sum of the thread momentum 102 in a live agent's queue 38 should not exceed the maximum response capacity 104 for that agent. The queue 38 may further represent the agent's available capacity 106, which is that agent's maximum capacity 106 minus the sum of the thread momentum 102 within the queue 38.

In one embodiment, the routing engine 28 may maintain one or more unassigned message threads that have been assigned a respective thread momentum 102 though are not yet assigned to a live agent. In such a case, the routing engine 28 may first filter the pool of total agents to identify a subset that have the technical and/or customer service expertise to handle the inquiry as best understood by the automated agent 32. The routing engine 28 may then consult the queue manager 30 to determine which agents in this subset are both accepting new threads and have available capacity to handle the unassigned thread without exceeding their available capacity 106. In one embodiment, once assigned by the routing engine 28, the queue manager 30 may then transfer the unassigned thread 108 to an agent's queue 38 and update the available capacity. In another configuration, live agents may be able to view the total pool of unassigned message threads for which they have the relevant expertise to answer, and may be able to then select or opt-in to conversations.

Once the message thread is loaded in an agent's queue 38, the queue manager 30 may operate to assign a response-time goal 112 to the thread 100 based on the thread's determined momentum score/value. In general, a response-time goal is a target maximum time that the agent allotted to respond to an outstanding user query. Response-time goals may vary inversely with the momentum value such that high momentum threads will have comparatively shorter response-time goals than lower momentum threads. In one embodiment, each thread 100 may further reflect the amount of time remaining 114 in a given response window. This time-remaining metric 114 may reflect the response-time goal minus the elapsed time since the last message was received from the user in that thread 100. This time-remaining metric 114 may resemble a countdown timer that indicates to the respective agent 36 how much time is still available to respond.

In one embodiment, the queue manager 30 may be configured to intervene if the time-remaining metric 114 reaches zero (i.e., the entire response-time window elapses) and the agent has not yet begun typing a response. Such an intervention may involve the queue manager 30 sending a message to the user to indicate that the agent is looking into the question and needs additional time. In one configuration, this intervention may be worded as if the agent personally sent the message. In one embodiment, this interventional message may start a secondary timer, such as shown as a negative number associated with "USER D" in FIG. 6, which may then be monitored for performance evaluation purposes and/or to adjust the agent's maximum response capacity 104.

Referring again to FIG. 1, once a response is provided by an agent to an outstanding inquiry, it is fed back to the thread management system 26, where the agent response is appended to the end of the message thread associated with the user's account. From there, the message is passed to the message engine 26, where it is transmitted back to the user via one or more of the messaging services 24. In one embodiment, because the present system operates independently of how the message is received and/or sent, some or all of the message thread may be made available across different messaging services. For example, a user may begin a conversation with an agent over SMS messaging while on the go, and then switch to an IP app when they arrive home. In such an example, the messaging engine 22 may make the entire message thread (or at least a predetermined number of the most recent messages) available via the IP app.

In some embodiments, the routing engine 28 may be persistent and may monitor each incoming message as it is appended to a message thread. For example, in some embodiments, the momentum monitor 34 may continuously update the momentum of a conversation, for example, using simple or exponential moving averages, or using other weighting schemes that may assign more recent momentum calculations with a greater weight than more distant ones. In this manner, a user who wishes to engage in a synchronous conversation after a period of extended delay may have their message thread more quickly assigned with faster response-time goals. In some embodiments, if an updated momentum for a particular thread 100 causes the sum of the thread momentum 102 in an agent's queue 38 to exceed the agent's maximum response capacity 104, then the routing engine 28 may automatically, or upon confirmation by the live agent, reassign a particular thread (e.g., the thread having the renewed user interest, or a thread of comparatively lower mass or momentum) to a different live agent. In another embodiment, if the sum of the thread momentum 102 only marginally exceeds the agent's maximum response capacity 104 (i.e., exceeds by less than a predetermined amount), then the routing engine 28 may simply prevent additional threads from being added to the queue, or may take such into consideration when assessing agent performance/responsiveness. Still further, in some embodiments, a buffer capacity may be maintained between the sum of the thread momentum 102 and the agent's maximum response capacity 104 so that fluctuations in momentum may be accommodated without exceeding the agent's maximum capacity.

In addition to continuous thread momentum updating, in some embodiments, the routing engine 28/automated agent 32 may continuously evaluate the user messages upon receipt using a natural language processing algorithm to assist the live agent providing support. More specifically, the automated agent 32 may analyze each received user message individually and/or in the context of the broader thread for the purpose of generating ancillary information that may be beneficial to the live agent and may be forwarded to the live agent together with the newly received message. Such ancillary information may include, for example, potential answers to the user's query, template response language, relevant product information; relevant order information, and the like. In the case of proposed response language, the live agent may have the ultimate discretion of whether to include the proposed language in a response, to modify/ supplement the proposed language in a response, or to ignore the proposed language altogether. The live agent's ultimate response may then be used to train the machine learning models of the automated agent so that it may provide improved and/or more relevant suggestions in the future.

Figure 7:
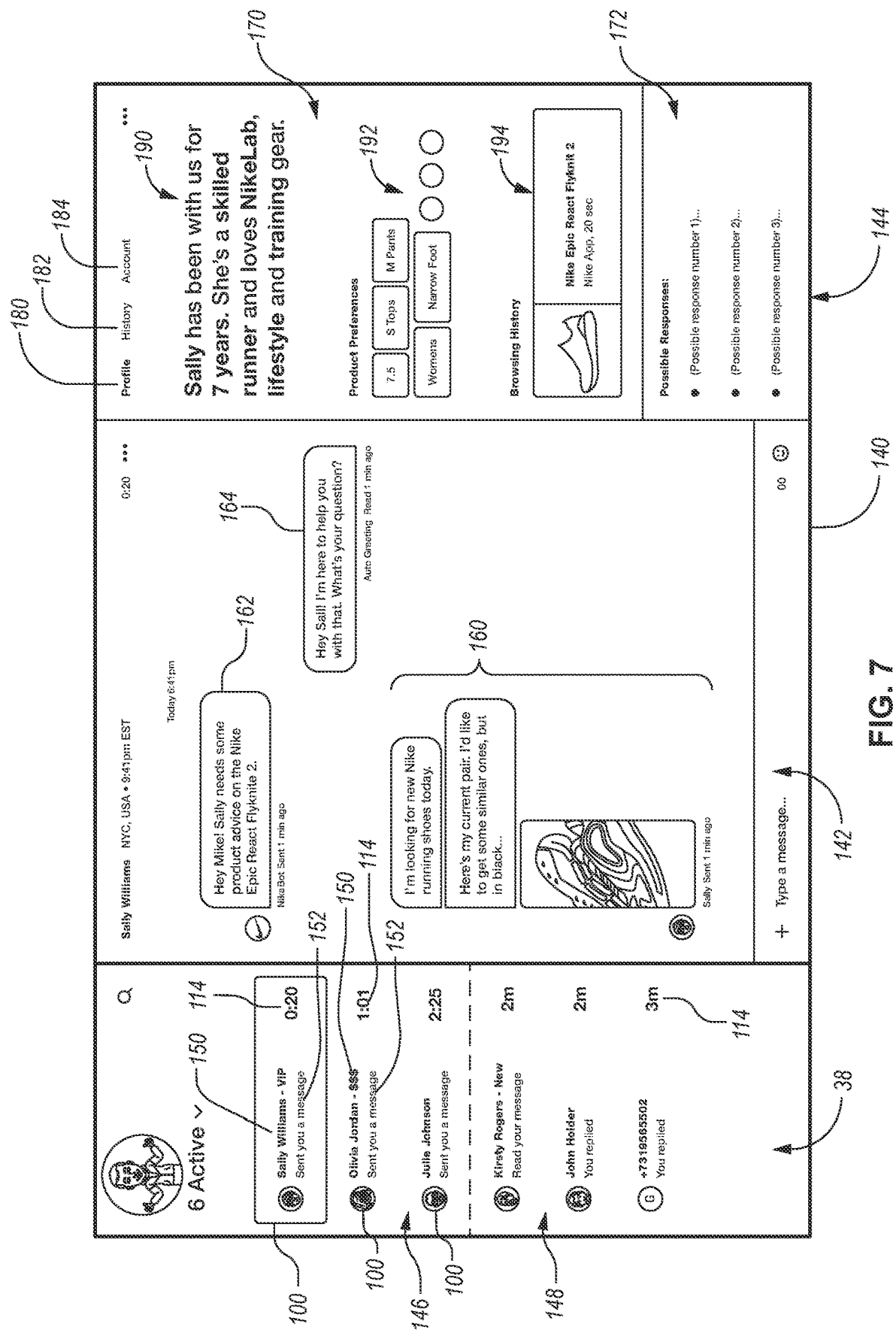
FIG. 7 is a schematic display screen that may be presented to a customer service agent for the purpose of managing a plurality of messaging threads and for providing a prompt response to a user.

FIG. 7 schematically illustrates one example of a screen/ interface 140 that may be presented to a live agent. As generally shown, the interface 140 includes a representation of the agent's queue 38 (similar to what is shown in FIG. 6), an active chat thread 142 for interacting with a user, and a support window 144 where received ancillary information (from the automated agent 32) may be displayed. The agent's queue 38 may include a plurality of active threads 100, which include a first plurality of active threads 146 that are awaiting an agent reply, and a second plurality of active threads 148 that have been replied to and are awaiting a user follow-up. Each thread 100 may include an associated name 150 (e.g., a username or name of the user), a message status identifier 152, and a time-remaining metric 114. Clicking on, or otherwise selecting one of the threads 100 then populates the chat thread 142 with the historic and on-going message thread between the agent/company and the user. Further selecting one of the threads 100 may also call up any recently provided ancillary information about the user and/ or user's inquiry in the support window 144.

As generally illustrated in FIG. 7, the chat thread 142 may comprise a mixture of user messages/queries to the agent/ company 160, messages 162 from the automated agent 32 to the live agent (e.g., facilitating a handoff), auto-generated responses 164 to the user from/on behalf of the live agent, and messages from the live agent to the user.

During the chat, the support window 144 may serve as the agent's primary source of information about the user and the user's query. By consolidating this information in a single window/region of the display, the present system may permit the agent to respond more promptly to the user. In some embodiments, the support window 144 may include a user attribute section 170 and a proposed response section 172. The user attribute section 170 may provide the agent with acquired insight about the user's interests, preferences, purchasing history, and the like, while the proposed response section 172 may include potential response language provided by the automated agent 32 (via a natural language processing algorithm) in an effort to guide or streamline the live agent's response.

In some embodiments, the user attribute section may include, for example, user profile information 180, user history information 182, user account information 184. The profile information 180 may include, for example, a brief summary of: the user 190; the user's product preferences 192 (e.g., typical products, styles, and/or colors that the user may purchase); the user's recent browsing history 194; the user's interests; the user's engagement with mobile apps or web pages; the user's spending patterns, and/or the user's contact information. History information 182 (i.e., which may populate once the tab header is selected) may include, for example, a summary of prior conversations with other agents, user social media engagement, tagged products, shared products, prior agent product suggestions, and the like. Finally, account information 184 may include a summary of prior user orders, ordered products, favorited products, product offers sent to the user, discount offers sent to the user, and the like.

The present system may further be configured to utilize multiple specialized live agents within the course of a single chat to provide the best quality answers to a user. For example, if during the course of one conversation/query, a user makes an unrelated request, prior systems may have required the agent to complete the current conversation and then transfer the conversation to a second agent that may assist on the unrelated request. In the present system, the secondary agent may become an assistant to the primary agent who is maintaining the active conversation with the user. In this manner, the entire conversation is seamless from the user's perspective, while involving multiple specialists on the agent side.

Figure 8:
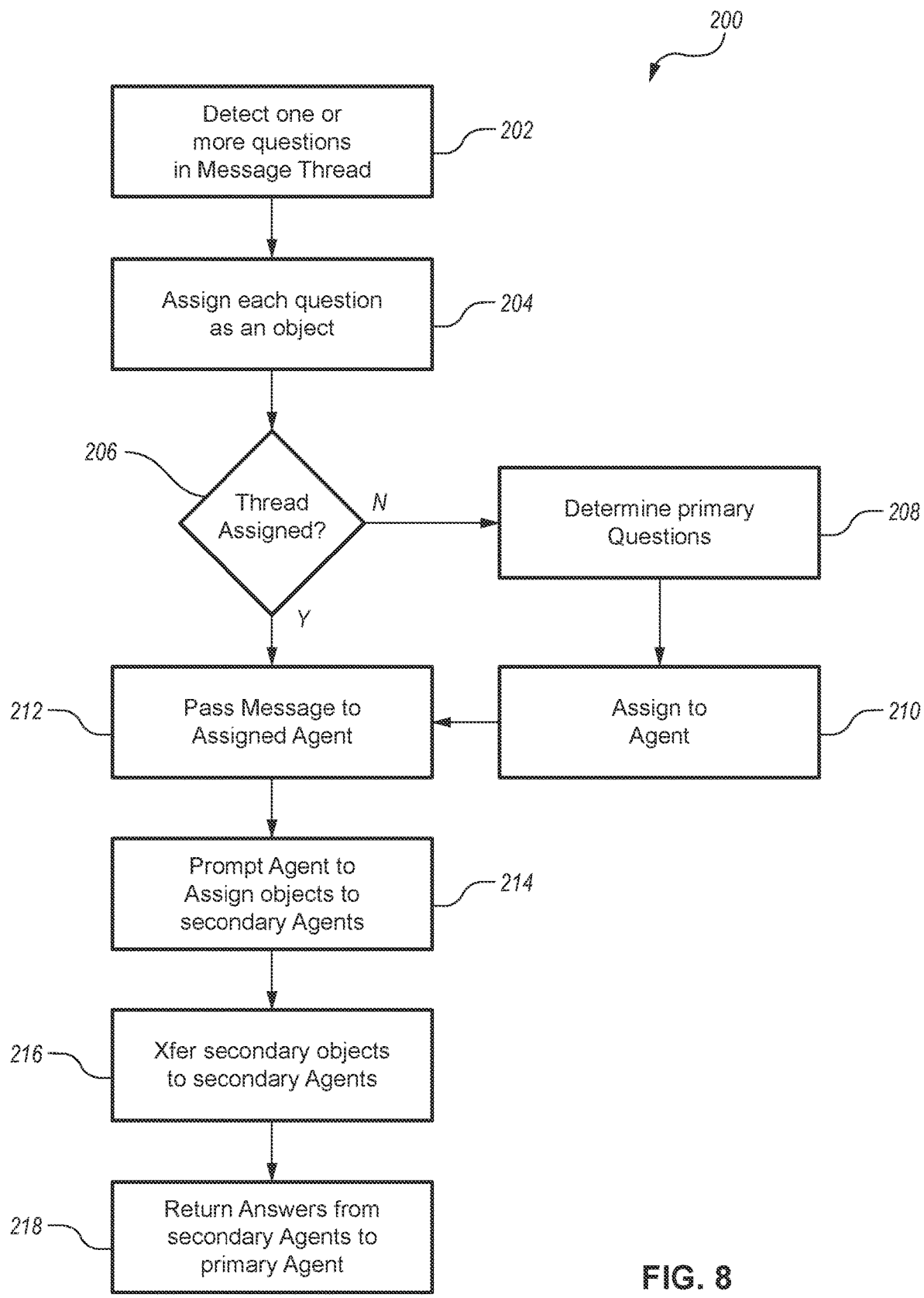
FIG. 8 is a schematic flow diagram illustrating a process for integrating multiple customer support agents into a single conversation with a user.

FIG. 8 provides a flow diagram of a process 200 of integrating the input from a plurality of agents into a support conversation while providing a seamless experience for the user. As generally illustrated, the process begins at 202 when the routing engine 28 detects one or more questions in a question thread. This may occur using one or more natural language processing algorithms that continuously monitor the incoming message flow. In one embodiment, the one or more questions may be contained within a single user message. In another embodiment, the one or more questions may be divided across a plurality of messages from a user, which may come in direct succession, or may have intervening agent responses.

Once the various questions have been identified at 202, each question may be coded as an object within software (at 204), and may be assigned a general topic or category. The system may then examine whether or not the user has an existing thread open (at 206). If not, then the routing engine 28 may begin by identifying a primary question/query at 208. The primary question may be the question that is determined to have the greatest mass or urgency, the greatest probability for escalation, and/or that may be answered by the broadest number of agents (according to predetermined agent scoring that is indicative of the agent's level of specialization, and their level of sophistication). In a general sense, knowledgeable, specialized agents (e.g. Olympic athletes) are more expensive resources than less knowledgeable agents. With continued reference to FIG. 8, once the primary question is determined (at 208) an agent with suitable experience for that question and with available capacity may be assigned as the primary agent (at 210).

If or when an agent is assigned to the thread, the process 200 may then include passing the received and analyzed message to that agent (at 212). The assigned primary agent may then be prompted or alerted to the existence of different questions/objects within the message or thread (at 214). In one configuration, the primary agent may select one of the non-primary objects (i.e., the secondary questions/objects) and elect to transfer that secondary question to a secondary agent (at 216). The secondary agent may then answer the question and the response may be forwarded back to the primary agent (at 218) for potential inclusion into the conversation. By prompting the primary agent initially, this process enables the primary agent to answer questions that he/she feels comfortable with, while referring out those questions that are more difficult or that require more specialized knowledge.

In one configuration, when the object is created (at 204), the routing engine 28 may determine one or more topic categories that the query may fall within. These categories may be pre-configured to match with existing departments/specialty areas and/or may be organically developed to provide system flexibility. Regardless, when the primary agent is prompted (at 214) to hand off the secondary questions, the prompt may include a list of available live agents who are a suitable fit for the determined category. Alternatively the agent selection may occur outside of the primary agent's view, though may still be based on suitability for the determined topic category for the query. In still other embodiments, the primary agent may flag a topic for assistance, which may send the query back to the broader pool of live agents where other available agents may select the query or otherwise opt in to the secondary conversation. Response time targets for the second agent may be dictated by the response time target for the primary conversation. More specifically, the response time goal for the second agent may be smaller than the response time goal for the primary agent. In one configuration, it may be a fixed duration shorter than the primary response time target.

Figure 9:
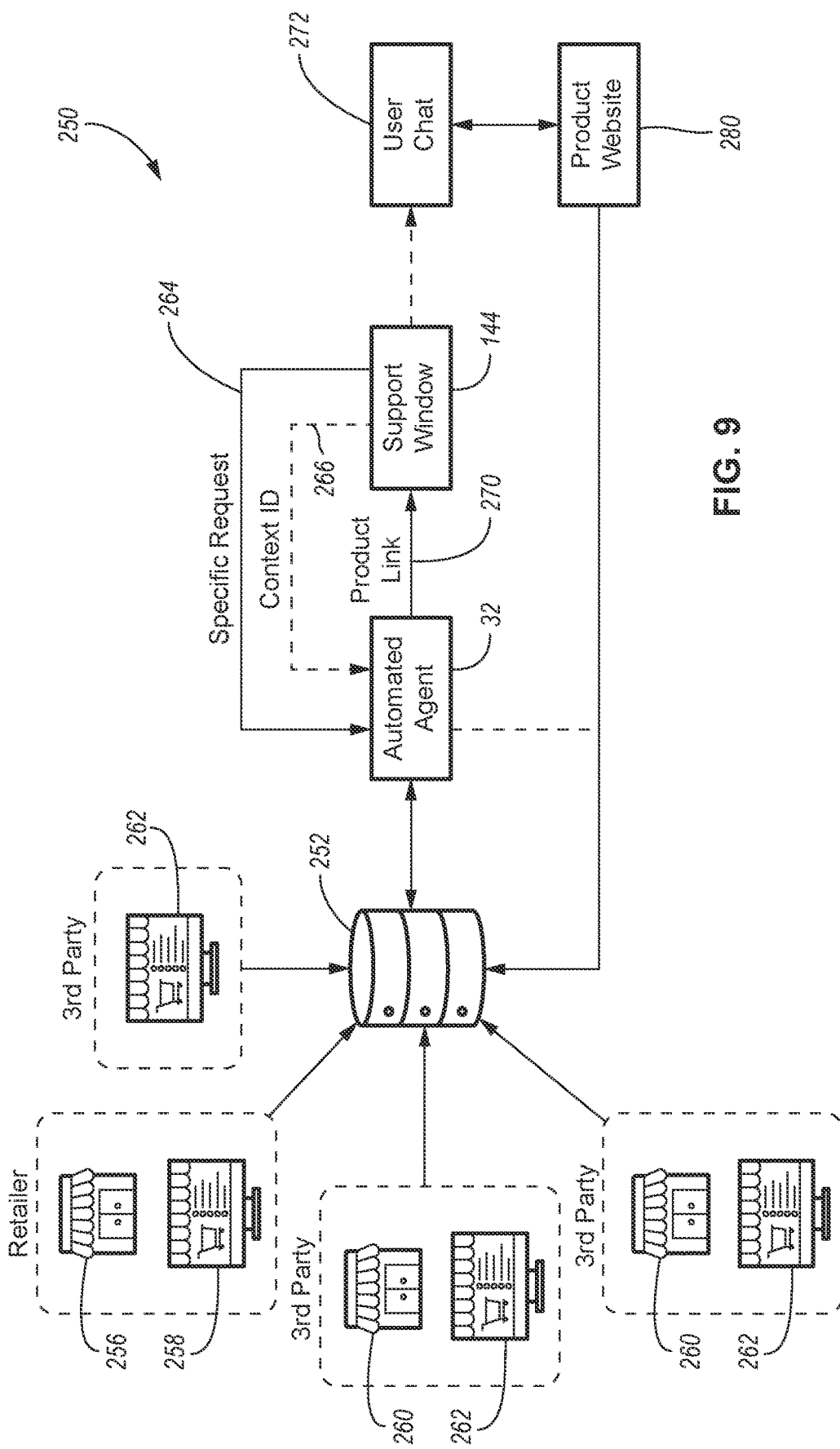
FIG. 9 is a schematic flow diagram illustrating a system for generating an e-commerce link for making a product sale from a retailer or one of a plurality of third-party retailers.

Referring again to FIG. 7, the support window 144 may further assist the agent by providing one or more deep links to specific product pages where a user can purchase the referenced product (i.e., links similar to what is shown as the user's browsing history 194). These links may be populated by the automated agent 32 and are easily copied to the chat window by the live agent. FIG. 9 schematically illustrates one embodiment of a system/method 250 that may be used to generate relevant deep links to specific product pages where a user can purchase a suggested product. As shown, the automated agent 32 may begin by assembling a database 252 of available inventory. This database 252 may identify some or all of the product inventory maintained by the retailer's brink and mortar stores 256, the retailer's e-commerce business 258, one or more third-party brick and mortar stores 260 (e.g., stores located proximate to the user), and/or one or more third-party e-commerce businesses 262. As used herein, the database 252 may be a persistent database that updates periodically, or it may be generated on-demand by the automated agent 32 polling one or more of the stores/businesses 256, 258, 260, 262 following the identification of a suggested product.

The link creation process may generally begin upon receiving a product request 264 from the user or live agent, or when the automated agent 32 recognizes a user's product history or is able to identify a specific product (266) from the context of the discussion between the user and the agent. Once this occurs, the automated agent 32 may consult the database 252 to determine if the product is available from the retailer or from a participating third party. If the agent 32 determines that the product is in stock, it may then generate a link 270 to a website where the product may then be purchased. This link 270 may be transmitted to the live agent and displayed on the support window 144, where the live agent may copy it into a chat interface 272.

When linking to specific product, or making product available for purchase, the automated agent 32 may generally be configured to give preference to product inventory that is maintained by the retailer if all other factors are equal. In situations where the user's requested timeline cannot be satisfied by the retailer, however, then the timeline may dictate referring to third-party inventory. For example, if the user requests same-day pick up, the automated agent 32 may prioritize brick and mortar stores over e-commerce sites, even if that means linking to a third party rather than the retailer's own inventory. In this manner, knowledge of the user's location as well as the location of the pertinent inventory is important in creating the most on-point product link. With this knowledge of third-party inventory, the live agent may be a single source of information on product availability, and the use of the automated agent 32 in this supporting role would eliminate the need for either the user or the live agent from having to scour third-party websites to determine availability.

Regardless of where the product originates from, in one configuration, the link 270 may direct the user to a front-end user interface, such as an internet app or product website 280 maintained by the retailer, which may serve as the sales interface for all purchases. More specifically, the link 270 may direct the user to an app or product website where local pickup or shipped options are both available (should the available inventory support this). If a sale is completed through the front-end user interface for local pickup at a local third party retailer, then the automated agent 32 (or other associated e-commerce system) would coordinate the purchase with that retailer while instructing the third party to hold the product for pickup. In other embodiments, the link 270 may direct the user to third party websites for direct purchase through those sites.

Referring again to FIG. 7, the user interface for the agent may dynamically change based on the consumer they are assisting. For example, the interface would only provide relevant product searches where the consumer is located (nearby inventory availability), switch language spell checker based on preferred consumer language, price will be in the correct currency of the consumer, etc. This could then enable agents from all around the world to assist any customer as long as they can speak/write the same language as the consumer they are assisting. For example, if a live agent in the US was assisting a consumer in China, the support window 144 would switch to Chinese relevant response info, have access to inventory in China stores, and all product prices would be in RBM.

Figure 10:
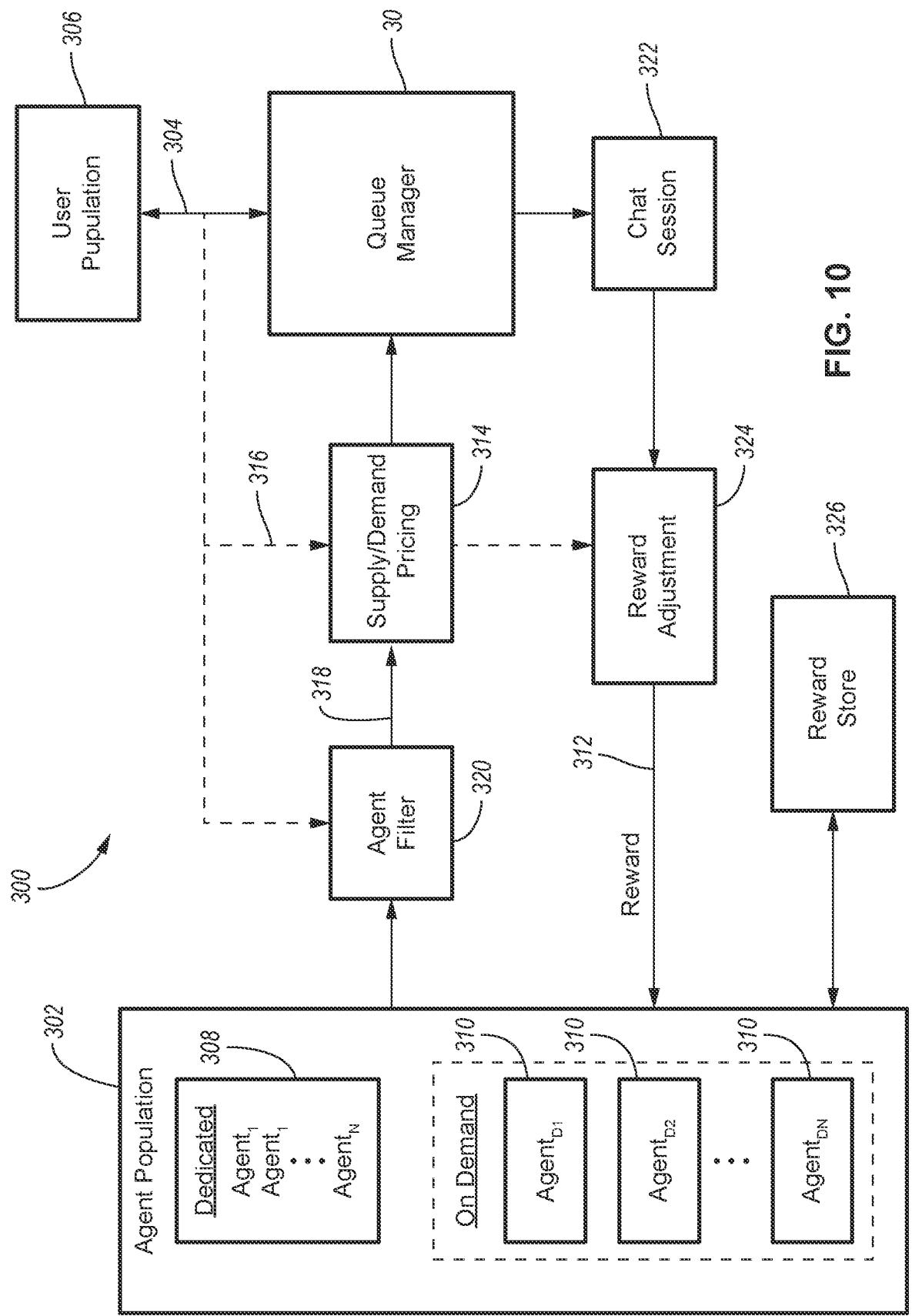
FIG. 10 is a schematic flow diagram illustrating a system for creating an elastic pool of live customer service agents for fielding inquiries from a user population.

FIG. 10 schematically illustrates a system level architecture 300 that may employ a plurality of live agents 302 (e.g, Agents $A_1$ through $A_n$ in FIG. 1) to respond to inquiries/communications 304 from a user population 306. In one configuration, the plurality of live agents 302 may comprise a plurality of centralized live agents 308 ($Agent_1$ through $Agent_N$) and/or a plurality of distributed live agents 310 ($Agent_{D1}$ through $Agent_{DN}$). Alternatively, this plurality of live agents 302 may comprise a plurality of dedicated live agents 308 (i.e., where customer service is their primary job responsibility even if they physically work in a decentralized manner) and/or a plurality of on-demand live agents 310. In general, the centralized/dedicated live agents 308 may be a group of agents who are all primarily tasked with providing customer service to the user population 306. In one configuration all of these agents may be located at a common call center. Conversely, the distributed/on-demand live agents 310 may include individuals who are operating in a more individualized or distributed capacity, or who have the ability to flex time from different responsibilities to the purpose of providing customer support. In one embodiment, these distributed/on-demand live agents 310 may include retail associates from brick and mortar retail stores who have available time during slow retail periods. Additionally, in some embodiments, these distributed/on-demand live agents 310 may include enthusiasts who are knowledgeable about the particular industry, though are not directly employed in a retail capacity (e.g., a competitive athlete supporting other athletes, employees of the company in non-retail or consumer facing roles, and the like).

To encourage an elastic agent pool, particularly among the distributed/on-demand live agents 310, one or more rewards 312 may be provided for responding to the needs of the user population 306 and for supporting the business's overall objectives. In one configuration, the magnitude of the reward 312 may be scaled via a supply/demand-pricing module 314 to adjust the reward according to one or more inquiry-pricing metrics 316 and/or the size 318 of the agent population that is qualified to handle the inquiry. Such inquiry-pricing metrics 316 may include the technical complexity of the request, the total number of outstanding/unassigned user inquiries, and/or the mass of the particular request. More complex inquiries, and higher mass inquiries may dictate larger rewards, as would a higher quantity of unassigned inquiries.

In one embodiment, live agents 302 may each be scored based on relevant technical expertise and/or expertise in their capacity as an agent, where their relative score or ability may qualify them for handling certain inquiries. For example, in an athletics context, a collegiate athlete would be deemed to have greater technical expertise in their sport than a high school athlete, though may have considerably less expertise in a different sport. Likewise, a career customer service (CS) specialist may have greater expertise in handling sensitive inquiries/customer concerns than an athlete with little formal CS experience. Further, a career CS agent for a particular sport may have developed more technical expertise in that sport than an amateur athlete, even if the CS agent does not play that sport personally. In one embodiment, expertise may be conveyed either as an experience point (XP) value, or as a level, where a certain amount of experience would then be required to advance to the next level.

With continued reference to FIG. 10, each user inquiry 304 may be evaluated by the automated agent 32 using its natural language processing to determine the inquiry's emotional intensity and required technical expertise. This evaluation may then adjust an agent filter 320 to limit the population of available agents to only agents with the relevant technical and customer service expertise (e.g., scores). In this manner, a marathon runner who has an urgent pre-race inquiry may have his/her query filtered so that only agent's with a certain level of running experience and a proven level of immediate responsiveness/issue resolution abilities may see the inquiry.

Following this filtering, and provided that the mass of the new conversation does not exceed the agent's available pre-determined capacity, available agents may opt-in to conversations/inquiries and establish a chat session 322 with the user. Each chat session 322 may be continuously evaluated by a reward adjustment module 324 according to a variety of dispute resolution and business promotion metrics. In this embodiment, positive dispute resolution outcomes and advancement of business promotion goals may lead to a positive reward adjustment, whereas dispute escalation and anti-business statements may lead to a negative reward adjustment. Examples of positive business practices that should be rewarded include, for example, signing users up for new customer accounts, encouraging users to log into existing accounts, establishing a relationship with the consumer such that the inquiry or contact occurs following the resolution of an initial inquiry, getting users to click through links to product pages, and making a sale. Examples of negative business practices that should be penalized include, for example, making disparaging comments about the company, product, or consumer. Similarly, dispute resolution outcomes may be based, for example, off of customer satisfaction surveys following the session.

Once the inquiry is resolved and the reward value is determined, the reward may be credited to an account belonging to the agent. In one embodiment, the reward may have a direct monetary value and may be exchanged for cash, merchandise, and/or discounts via a reward store 326. In another embodiment, the reward may be a token or credit that has no direct monetary value, though may be exchanged for one or more digital items or in a gacha-style game to receive a loot/prize box via the store 326. This loot box may contain one or more digital items of varying scarcity that, for example, may be used to adorn the user's account and/or be displayed in conjunction with an avatar belonging to the user. In one embodiment, the gacha-style game may enable the agent to receive one or more digital collectables, which may be uniquely stored/identified/validated on a blockchain ledger (i.e., where the digital collectable directly corresponds with a token stored on a distributed blockchain ledger) to ensure their scarcity. In a further extension, this digital collectable may be capable of being used in one or more video game applications to improve an attribute of the user's character or gameplay, such as described in U.S. patent application Ser. No. 16/707,741, filed 9 Dec. 2019 which is incorporated by reference in its entirety and for all that it discloses.

In a further extension of the architecture shown in FIG. 10, in one embodiment, each agent may have an avatar that may act as the forward facing image of the agent to the user (such as illustrated in the upper left corner of the user interface shown in FIG. 7). In one embodiment, one or more attributes of the avatar may evolve or exist according to the agent's scored technical expertise. For example, as the agent becomes more knowledgeable about running, the avatar may acquire different or more scarce running shoes. In some embodiments, the agent's selection of avatar embellishments (clothes, accessories, activities, scenes, etc.) may provide insight about the agent's interests, which may further serve to aid in routing a user's inquiry.

In still another embodiment, the present system may be used to assist a user in designing a custom article (e.g., shoe or article of apparel), for example, via a web interface such as the NIKEID® or NIKE BY YOU® systems, commercialized by Nike Inc. If the user needs assistance or inspiration, he/she may have the option of connecting with a live agent via the present system. Likewise, if the user dwells on a particular design choice for more than a preset amount of time, or alters their selection more than a predetermined number of times, the automated agent 32 may see that the consumer is struggling and may automatically notify a design agent to assist. The connected live agent may then have the option of chat with the consumer to assist in designing, take over their UI control, or open up a video chat session to further engage with the user. Additionally, as the user is designing the article, the user interface/experience can be recorded, which may then be turned into a time lapse video to be shared by the consumer to their social network or it can be used by the agent as a record to better assist the consumer next time. In some embodiments, data may be extracted from video to learn more about the consumer and how to improve the creation experience for subsequent users.

While the disclosure provided above is primarily focused on a retail/customer service context, this example of the current functionality should not be interpreted to unnecessarily constrain the present technology. Instead, it is an example of the present technology being used to facilitate business-consumer communications. In other examples, however, the present technology may be used to manage communications between companies (e.g., a supply base communicating with an OEM), or even between individuals within a single organization (e.g., a manager and his/her team).

In these business-business examples, the manner of communication is often not much different than in the retail/customer support context. Employees, project teams, and suppliers, are finding new ways to communicate, including SMS/MMS messaging, IP based chat systems, and other such means of communication. While explicit response times may not apply to the same extent, the notion of conversational momentum may be used in a similar manner to manage an individual's response priorities (i.e., a supervisor synchronously texting may have both a high velocity and a high mass, whereas an office manager seeking an RSVP for a pizza lunch over email may have a low mass and a low velocity). Similar notions of automated responses may likewise apply in an intrabusiness or interbusiness context.

In a further extension of the present system, because the routing engine 28 and automated agent 32 may be persistent and may process each message as it is received, the present system is particularly well suited for determining macro-level issues and trends. Furthermore, because the system understands user characteristics, it may be configured to identify the demographics, interests, and/or geographical areas that are driving the issues/trends. In either instance, this real-time info would allow the company to pivot to better meet the needs and/or demands of the consumer. (e.g., tweak messaging to head off an issue, or alter development/product plans to more quickly respond to the trend. Similarly, the agent 32 may be well positioned to assess user response and satisfaction to specific answer types (i.e., prior to the engagement of the live agent). With this macro-level understanding, the automated agent 32 may adapt its response strategy over time to drive toward a greater sense of user satisfaction. Additionally, the automated agent 32 may use actual live agent responses to the user as training data to improve its ability to directly respond to the user and/or to improve its ability to provide meaningful suggested responses to the live agent. This training data may further be weighted according to the live agent's relative rank or customer service score, where the responses of more skilled agents would have a greater weight in the training data set than responses of less skilled agents.

In one embodiment, the automated agent 32 may have a defined personality for purpose of generating natural language responses with a suitable tone. For example, if the present system were used to support an athletics apparel/equipment brand, the automated agent 32 may be constructed to resemble: a 25-30 year old post-collegiate D1 athlete (e.g., All American runner); an athlete at the DNA level, but a hype beast in the office; an avid supporter/ambassador of the brand; someone who cops exclusive sneaker drops, but believes that you should wear your kicks from social media to the field of sport; someone with serious opinions about who the GOAT is and what the best meal is after a hard workout; quick witted, a little sassy, and a pro at culturing a long term inside joke; a friend that will never talk down to you, though is super passionate and very confident (minus the arrogance); causal, but not over the top; and someone who enjoys celebrating the higher love. Other personality types may also be used. Finally, while the automated agent may have a name, such as Eugene, those who know it well may simply refer to it as Rocco.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

In one configuration, the various aspects of FIG. 1 may be implemented as executable code within a distributed, cloud-based computing infrastructure that includes one or more server-class computing devices operative to manage the flow and processing of digital information. The user display, such as shown in FIG. 7 may be viewable on a user device, such as via a dedicated application or internet browser. The information populated within the user display of FIG. 7 may be provided, for example, by the server-class computing device used to implement FIG. 1. It should be appreciated that other hardware or computing arrangements may be used to embody and/or implement the presently described systems.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

The invention claimed is:

1. A multi-channel communication platform comprising:
 a messaging engine operative to receive a plurality of textual messages from a user, the plurality of textual messages forming a message thread and including at least one query requesting a reply;
 a routing engine operative to transmit the message thread to a message queue associated with a live agent and to receive a reply from the live agent and transmit the reply to the user;
 a queue manager operative to provide the live agent with a reward following a response to the query; and
 wherein the reward is a variable reward based on one or more of: the perceived complexity of the query; a number of outstanding or unassigned queries; or the perceived urgency of the query.

2. The multi-channel communication platform of claim 1, wherein the queue manager is operative to specify a response time goal for providing the reply to the at least one query.

3. The multi-channel communication platform of claim 2, wherein the routing engine is further configured to determine a momentum of the plurality of textual messages;
 wherein the momentum is a function of a mass and a velocity of the message thread, wherein the mass of the message thread is a measure of an urgency of the message thread, and wherein the velocity is a measure of a speed at which the plurality of textual messages are received.

4. The multi-channel communication platform of claim 3, wherein the response time goal is inversely proportional to the determined momentum.

5. The multi-channel communication platform of claim 3, wherein:
 the message queue comprises a plurality of message threads, each having a different momentum value;
 the message queue has a maximum momentum; and
 wherein a sum of the momentum value from each of the plurality of message threads in the message queue is less than the maximum momentum.

6. The multi-channel communication platform of claim 1, wherein the reward comprises a digital currency.

7. The multi-channel communication platform of claim 6, further comprising:
 an avatar representing the agent that is operative to be displayed to the user; and
 a digital reward store operative to provide a digital embellishment for display in conjunction with the avatar in exchange for the digital currency.

8. The multi-channel communication platform of claim 7, wherein the digital embellishment is uniquely secured to a token stored on a distributed blockchain ledger.

9. The multi-channel communication platform of claim 1, wherein the live agent has an associated experience score; and
 wherein the routing engine is operative to analyze the message thread to determine a required experience for responding to the query; and
 wherein the routing engine is operative to transmit the message thread to the message queue associated with the live agent if the experience score associated with the live agent is greater than the determined required experience for responding to the query.

10. The multi-channel communication platform of claim 1, wherein the routing engine selects the live agent from a pool of live agents.

11. The multi-channel communication platform of claim 10, wherein the pool of live agents comprises a plurality of dedicated live agents and a plurality of on-demand live agents.

* * * * *